United States Patent [19]
Munn

[11] 3,799,581
[45] Mar. 26, 1974

[54] WHEEL HUB WITH IMPROVED ADJUSTABLE ECCENTRIC MOUNTING

[76] Inventor: John M. Munn, 1633 Cottonwood, Grand Prairie, Tex. 75050

[22] Filed: Apr. 19, 1972

[21] Appl. No.: 245,342

Related U.S. Application Data

[63] Continuation-in-part of Ser. No. 97,846, Dec. 14, 1970, abandoned.

[52] U.S. Cl. .............................................. 280/229
[51] Int. Cl. ......................................... B62m 1/00
[58] Field of Search ........ 280/229; 301/1, 5; 74/600

[56]        References Cited
          UNITED STATES PATENTS

| 3,371,944 | 3/1968  | Daniels  | 280/229 |
| 3,292,946 | 12/1966 | Melson   | 280/229 |
| 883,746   | 4/1908  | Robbins  | 280/229 |
| 605,182   | 6/1898  | Johnston | 280/229 |
| 421,297   | 2/1890  | Mills    | 74/600  |
| 1,385,768 | 7/1921  | Angle    | 74/600  |
| 1,847,048 | 2/1932  | Orr      | 74/600  |

Primary Examiner—Kenneth H. Betts
Assistant Examiner—J. D. Rubenstein
Attorney, Agent, or Firm—Clarence A. O'Brien; Harvey B. Jacobson

[57]    ABSTRACT

A double disc assembly including an outer disc and an inner disc is provided at each side of the associated wheel and the inner and outer discs of each assembly are secured together for adjustable angular displacement about a center axis. A substitute axle assembly is secured through the center hub of the associated wheel and the substitute axle assembly is rigidly secured to the wheel hub and to the inner discs of the disc assemblies at corresponding points spaced radially outwardly of the axes of relative rotation of the discs or disc members of each disc assembly. In addition, each outer disc is journalled from the associated bicycle fork arm for rotation about an axis spaced the same radial distance from the axis of relative rotation of the disc members. In this manner, the substitute axle, which is stationarily secured through the center hub of the associated wheel, may be swung into alignment with the axes of rotation of the outer disc members relative to the bicycle fork arms or swung about the axes of relative rotation of the disc members relative to the axes of rotation of the outer discs relative to the fork arms whereby the axis of rotation of the entire wheel assembly may be eccentrically disposed relative to the center hub of the wheel.

15 Claims, 8 Drawing Figures

PATENTED MAR 26 1974　　　　　　　　　　3,799,581

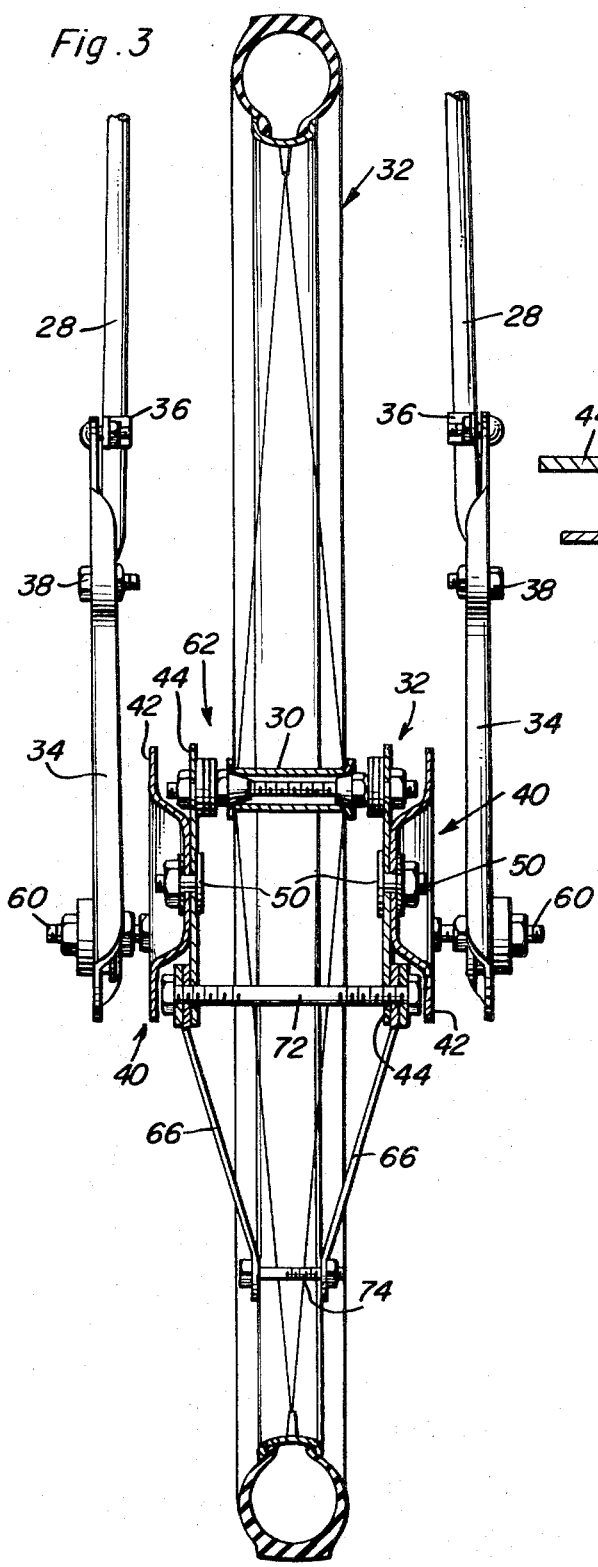
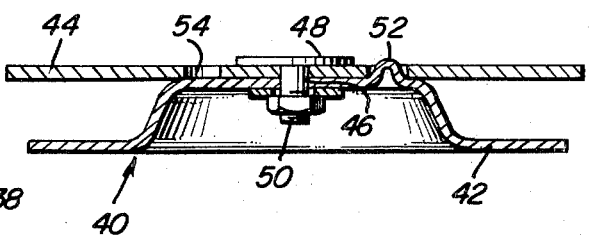
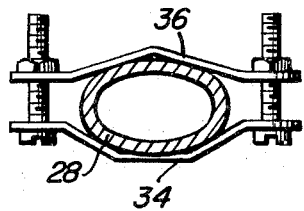
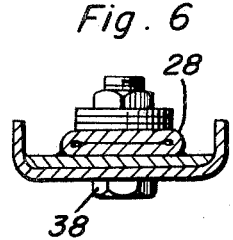

PATENTED MAR 26 1974 3,799,581

WHEEL HUB WITH IMPROVED ADJUSTABLE ECCENTRIC MOUNTING

This application comprises a continuation-in-part of my copending U.S. Pat. application Ser. No. 97,846, filed Dec. 14, 1970, for Wheel Hub With Adjustable Eccentric Mounting, now abandoned.

The wheel assembly of the instant invention has been designed for use as the front wheel of a bycycle, but also may be utilized on other vehicles and as a component of a rotary cam member, if desired.

The wheel assembly incorporating the adjustable eccentric hub of the instant invention is illustrated and described hereinafter as a spoked wheel, although disc type wheels may be used, if desired.

The eccentric hub structure may be adjusted to position its axis of rotation concentric with the outer periphery of the wheel or eccentric relative to the outer periphery of the wheel.

The main object of teis invention is to provide an adjustable wheel assembly including means by which the axis of rotation of the wheel may either be concentrically disposed relative to the outer periphery of the wheel or eccentrically disposed.

Yet another object of this invention, in accordance with the immediately preceding object, is to provide a wheel hub eccentric mounting structure specifically designed for use in conjunction with spoked wheels of the type utilized on bicycles and tricycles.

Another important object of this invention is to provide a wheel construction in accordance with the preceding object with the adjustable eccentric hub mounting structure of the instant invention operatively associated therewith in a manner such that the load carrying capacity of the wheel is not reduced.

A still further object of this invention is to provide an adjustable wheel assembly in accordance with the preceding objects which may be readily utilized in conjunction with and adapted to the spoked wheels of substantially all bicycles.

A final object of this invention to be specifically enumerated herein is to provide a wheel assembly in accordance with the preceding objects which will conform to conventional forms of manufacture, be of simple construction and easy to use so as to provide a device that will be ecomonically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 3 is a fragmentary vertical sectional view taken substantially upon the plane indicated by the section line 3—3 of FIG. 2;

FIG. 4 is an enlarged diametric sectional view of one of the double disc assemblies of the instant invention and illustrating the manner in which detent means is provided for maintaining the two disc members of the double disc assembly in adjusted rotated position;

FIG. 5 is an enlarged sectional view taken substantially upon the plane indicated by the section line 5—5 of FIG. 1;

FIG. 6 is an enlarged horizontal sectional view taken substantially upon the plane indicated by the section line 6—6 of FIG. 1;

Figure 1:
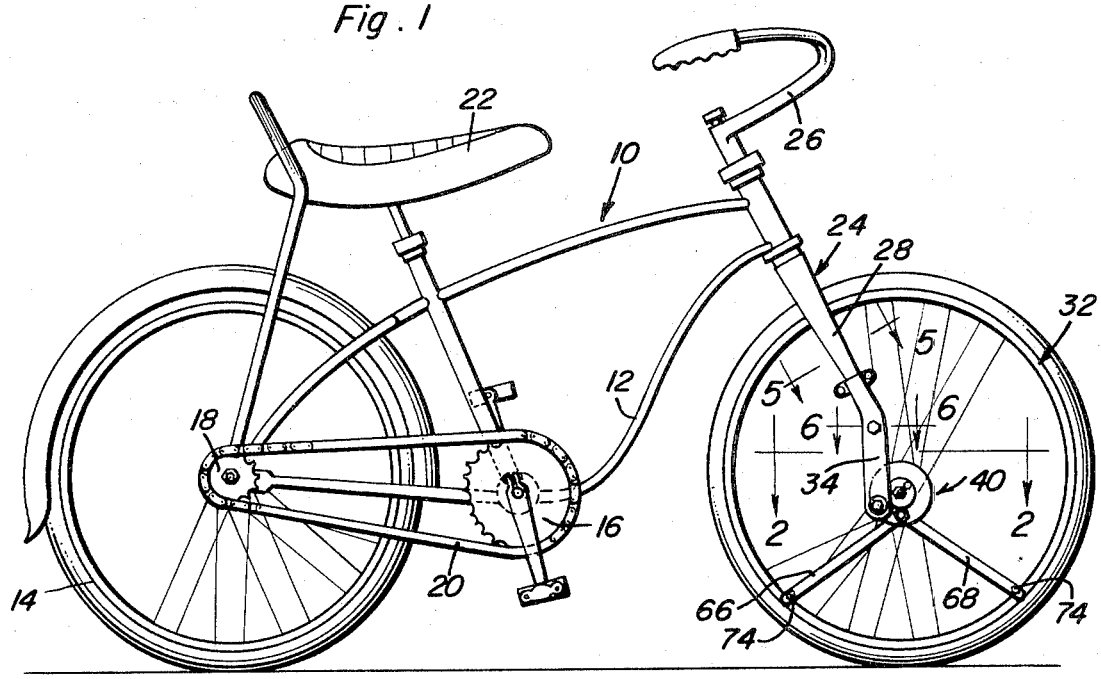
FIG. 1 is a side elevational view of a conventional form of bicycle including a front wheel constructed in accordance with the present invention.
Figure 2:
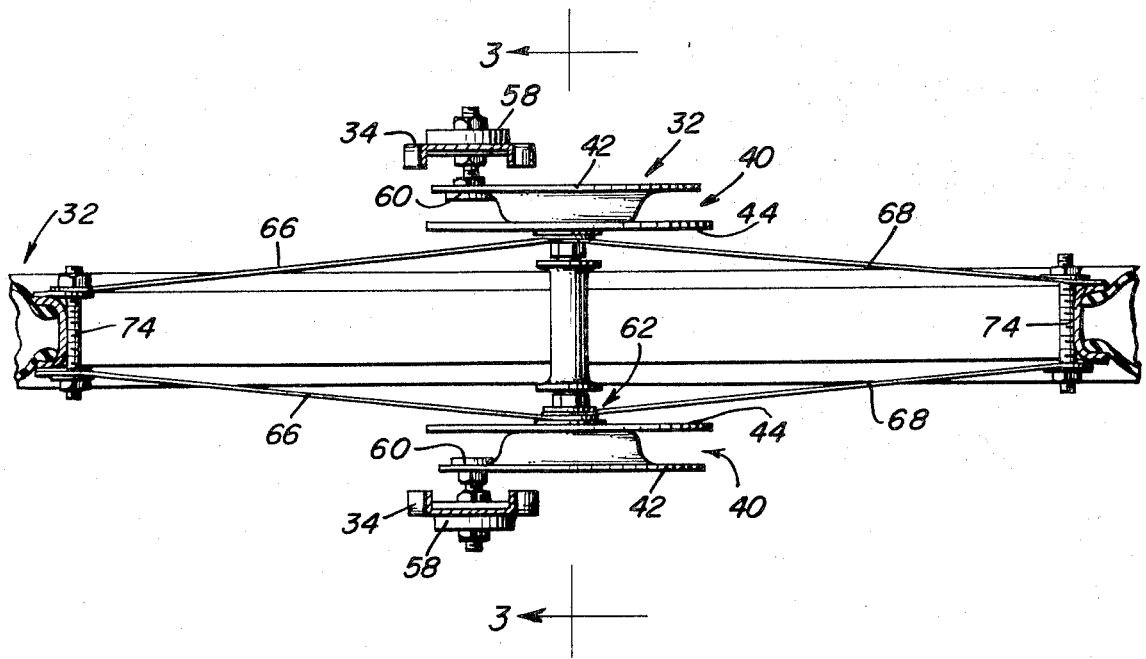
FIG. 2 is an enlarged fragmentary horizontal sectional view taken substantially upon the plane indicated by the section line 2—2 of FIG. 1.
Figure 7:
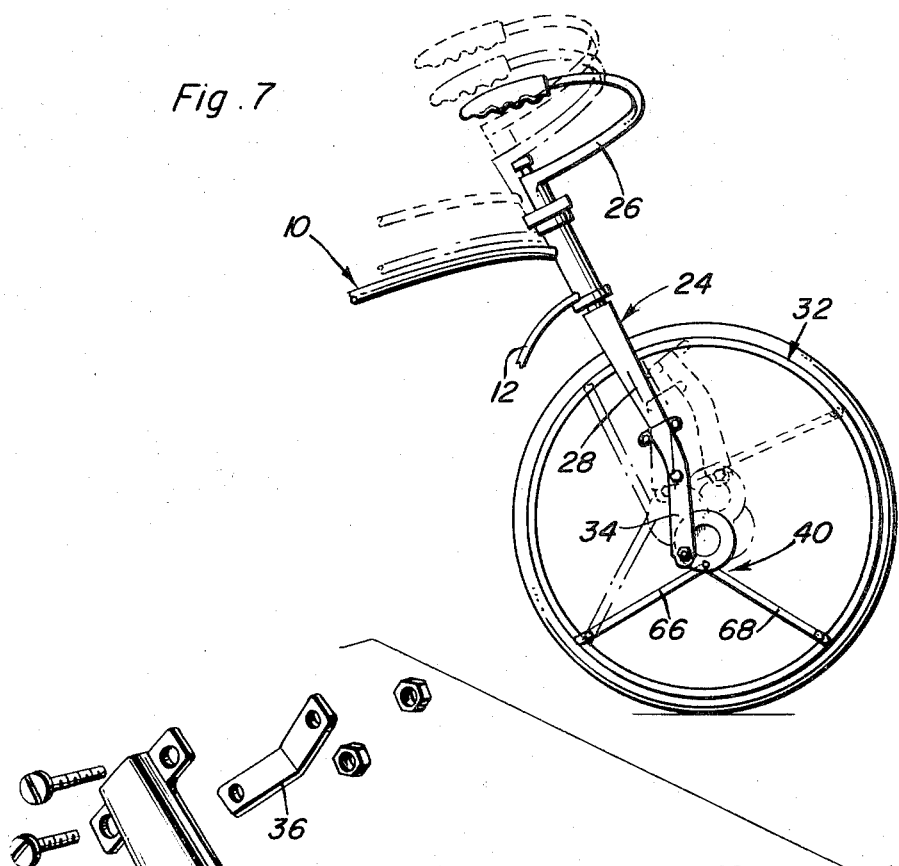
FIG. 7 is a fragmentary side elevational view of the bicycle of FIG. 1 illustrating different positions of the wheel mounting structure and bicycle in phantom lines according to different adjustments being made in the double disc assemblies.
Figure 8:
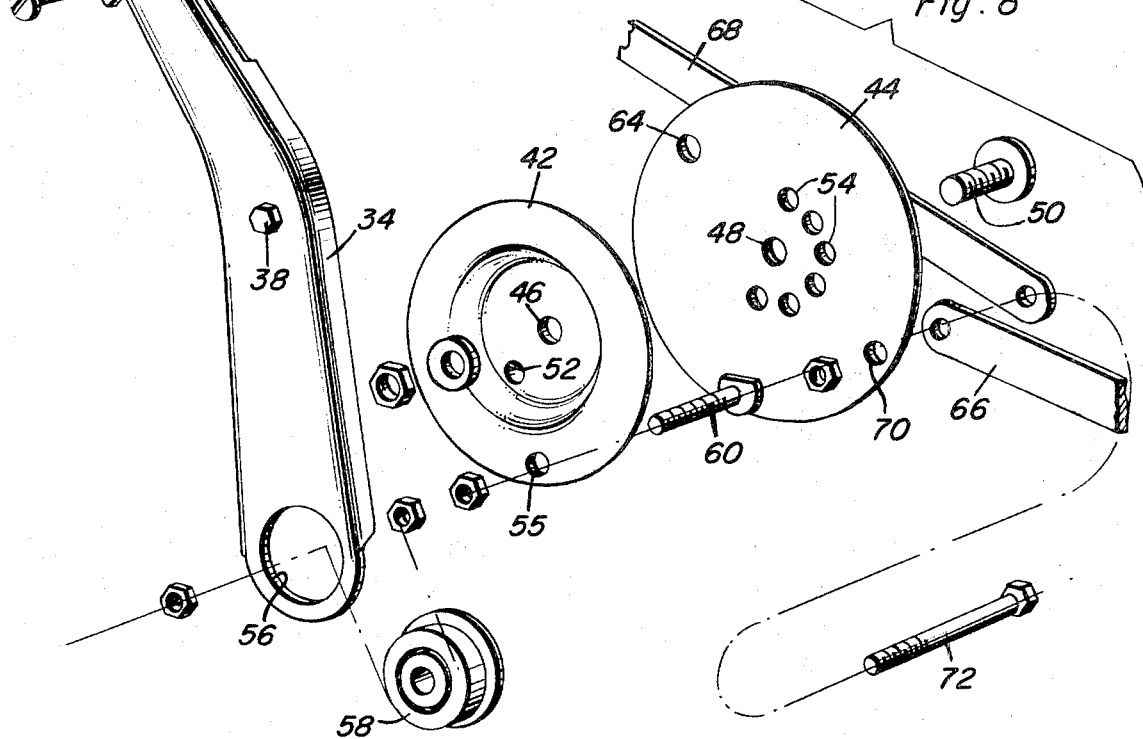
FIG. 8 is an exploded perspective view of one half or one side of the adjustable eccentric wheel hub mounting structure.

Referring now more specifically to the drawings, the numeral 10 generally designates a conventional form of bicycle including a frame 12, a rear wheel 14, a pedal sprocket 16 drivingly connected to a rear wheel sprocket 18 by means of an endless flexible chain 20, a seat 22 and a front fork assembly referred to in general by the reference numeral 24 including an upper handle bar assembly 26 and depending opposite side fork arms 28.

The foregoing comprises a description of a conventional form of bicycle and the lower ends of the fork arms 28 conventionally support the opposite ends of a front transverse axle assembly (not shown) upon which the central hub portion or hub 30 of a conventional front wheel referred to in general by the reference numeral 32 is journalled.

The adjustable eccentric wheel mounting structure of the instant invention is referred to in general by the reference numeral 32 and includes a pair of channel-shaped and slightly angulated fork arm extensions 34. The upper ends of the extensions 34 are clamped to the lower end portions of the fork arms 28 by means of clamp straps 36, the central portions of the extensions 34 being secured to the apertured lower ends of the fork arms 28 by means of fasteners 38.

The assembly 32 additionally includes a pair of opposite side double disc assemblies referred to in general by the reference numerals 40. The double disc assemblies are identical and each includes an outer dished disc or first mounting member 42 and an inner planar disc or second mounting member 44. Each pair of discs 42 and 44 are centrally apertured as at 46 and 48, respectively, and secured together for adjustable angular displacement by means of a pivot fastener 50. In addition, each dished disc 42 includes an eccentric detent 52 and each disc 44 includes a set of circumferentially spaced apertures 54 evenly radially outwardly spaced from the corresponding aperture 48 and with which the corresponding detent is registrable. When the fastener 50 is tightened with the detent 52 seated in one of the apertures 54, the discs 42 and 44 are locked together against relative angular displacement about the pivot fastener 50. However, the pivot fastener 50 may be loosened sufficiently for the detent 52 to ride out of one of the apertures 54 and to thus enable relative rotation between the discs 42 and 44 so as to seat the detent 52 in another aperture 54 before the fastener 50 is retightened.

Each outer disc 42 includes a mounting aperture 55 on its outer periphery and the lower end of each extension 34 is provided with a large aperture 56 in which a bearing assembly 58 may be seated. A fastener or stub axle 60 is secured through each aperture 55 and the corresponding bearing assembly 58 in order to journal the corresponding double disc assembly 40 from the associated extnesion 34. In addition, after the conventional axle assembly is removed from the center hub of the wheel 32, a substitute axle assemlby on member referred to in general by the reference numeral 62 is secured through the hub 30. The opposite ends of the substitute axle assembly 62 are secured through corresponding apertures 64 formed in the discs 44. The substitute axle member 62 is secured through the center hub 30 in a manner preventing rotation of the hub 30 relative to the axle assembly 62 and the axle assembly 62 is secured through the discs 44 in a manner preventing rotation of the axle assembly 62 relative to the discs 44. In addition, each double disc assembly includes a pair of brace arms 66 and 68 which have one pair of corresponding ends formed through an outer peripheral aperture 70 formed in the corresponding disc 44 by means of a fastener 72 extending between the discs 44 and the free ends of each pair of corresponding opposite side arms 66 and 68 have a fastener 74 secured thereto whereby the outer terminal ends of each pair of arms 66 and 68 may clampingly engage an adjacent rim portion of the wheel 32 therebetween. Thus, the double disc assemblies are rigidly supported from opposite sides of the wheel 32 and the discs 42 and 44 may be adjustably relatively rotated to either align the substitute axle assembly 62 with the fastener 60 or eccentrically position the substitute axle member 62 relative to the fastener 60.

The lower ends of the extensions 34 are inclined downwardly so as to maintain substantially the same horizontal distance between a vertical transverse plane containing the substitute axle member and the journal portion of the frame 12 for the front fork assembly 24 as that enjoyed by the original axle assembly of the wheel 32 secured between the apertured lower ends of the fork arms 28.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A wheel mounting structure comprising opposite side pairs of first and second mounting members pivotally connected together for relative adjustable angular displacement about generally aligned first center axes, means carried by one member of each pairs of members for journaling said pair of mounting members from a support for angular displacement about second generally aligned journal axes spaced radially outwardly from said center axes, and means carried by the other members of each pair of members for journaling a wheel therefrom for rotation about generally aligned third axes also radially spaced from said first axes.

2. The combination of claim 1 wherein said second and third axes are equally spaced from said first axes and are alignable when said pairs of mounting members are rotated to predetermined relative positions.

3. The combination of claim 1 wherein said pairs of mounting members comprise opposite side pairs of inner and outer disc members pivotally connected at their center portions for angular displacement relative to each other.

4. The combination of claim 3 wherein each pair of inner and outer disc members includes means operative to lock said disc members in predetermined relative rotated positions.

5. The combination of claim 4 wherein the last mentioned means includes a series of circumferentially spaced apertures in one of said disc members equally spaced from said center axes and a laterally projecting detent on the other of said disc members registrable with and seatingly engageable in said apertures in predetermined relative rotated positions of said disc members.

6. The combination of claim 1 including a wheel having a central hub portion defining an axial passage therethrough, said means carried by said other members comprising an axle member stationarily secured through said hub portion and stationarily secured to and extending between said other members.

7. The combination of claim 6 wherein said means carried by said one members comprise stub axle members supported therefrom.

8. The combination of claim 7 including a bicycle front fork assembly including a pair of generally parallel arms having one set of corresponding free ends, bearing means carried by said free ends journaling said stub axle members therefrom for rotation about aligned axes.

9. The combination of claim 8 including a pair of elongated arm extensions carried by and extending endwise outwardly of said free ends, said bearing means being carried by the outer ends of said extensions.

10. The combination of claim 9 wherein said pairs of mounting members comprise opposite side pairs of inner and outer disc members pivotally connected at their center portions for angular displacement relative to each other.

11. The combination of claim 10 wherein each pair of inner and outer disc members includes means operative to lock said disc members in predetermined relative rotated positions.

12. The combination of claim 11 wherein the last mentioned means includes a series of circumferentially spaced apertures in one of said disc members equally spaced from said center axes and a laterally projecting detent on the other of said disc members registrable with and seatingly engageable in said apertures in predetermined relative rotated positions of said disc members.

13. The combination of claim 1 including a bicycle front fork assembly having a pair of generally parallel arms defining one set of corresponding free ends, said means carried by said one member of each pair of members journaling said one members of said pairs of mounting members from said free ends.

14. The combination of claim 13 including a pair of elongated arm extensions carried by and extending endwise outwardly of said free ends, said bearing means being carried by the outer ends of said extensions.

15. The combination of claim 14 wherein said second and third axes are equally spaced from said first axes and are alignable when said pairs of mounting members are rotated to predetermined relative positions.

* * * * *